(12) United States Patent
Fukuyama et al.

(10) Patent No.: US 8,047,565 B2
(45) Date of Patent: Nov. 1, 2011

(54) SIDE AIRBAG APPARATUS AND METHOD FOR FOLDING AIRBAG

(75) Inventors: Takaki Fukuyama, Aichi-ken (JP);
Yasushi Okada, Aichi-ken (JP);
Shigeyuki Suzuki, Aichi-ken (JP);
Masashi Hashiba, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 50 days.

(21) Appl. No.: 12/659,499

(22) Filed: Mar. 11, 2010

(65) Prior Publication Data
US 2010/0237595 A1 Sep. 23, 2010

(30) Foreign Application Priority Data

Mar. 19, 2009 (JP) .................................. 2009-068224

(51) Int. Cl.
*B60R 21/16* (2006.01)
(52) U.S. Cl. ................ 280/730.2; 280/743.1; 280/743.2
(58) Field of Classification Search ............... 280/730.2, 280/743.1, 743.2
See application file for complete search history.

(56) References Cited

U.S. PATENT DOCUMENTS

| 5,992,882 | A | 11/1999 | Ito et al. | |
| 7,364,185 | B2 * | 4/2008 | Mori et al. | 280/730.1 |
| 7,581,750 | B2 * | 9/2009 | Hirata et al. | 280/730.1 |
| 7,621,558 | B2 * | 11/2009 | Mori et al. | 280/730.1 |
| 7,878,530 | B2 * | 2/2011 | Mizuno et al. | 280/730.1 |
| 7,918,482 | B2 * | 4/2011 | Sugimoto et al. | 280/729 |
| 2004/0066022 | A1 * | 4/2004 | Mori et al. | 280/730.1 |
| 2004/0239084 | A1 * | 12/2004 | Mori et al. | 280/730.1 |
| 2006/0138754 | A1 * | 6/2006 | Hirata et al. | 280/730.1 |
| 2009/0001695 | A1 | 1/2009 | Suzuki et al. | |

FOREIGN PATENT DOCUMENTS

| JP | A-09-207698 | 8/1997 |
| JP | A-2008-195355 | 8/2008 |
| JP | A-2009-6860 | 1/2009 |

\* cited by examiner

*Primary Examiner* — Toan To
(74) *Attorney, Agent, or Firm* — Posz Law Group, PLC

(57) ABSTRACT

A side airbag apparatus 1 is provided between tops 8 of seat backs 2b, 3b. When supplied with inflation gas from an inflator 1c, an airbag 20 is projected from a storage portion 1b. At this time, the airbag 20 is first inflated and deployed upward and forward at the height of an occupant, so as to be capable of restricting the movement of the occupant's head toward the inside of the vehicle at an early stage of a side collision.

8 Claims, 6 Drawing Sheets

Fig.3(a-1)
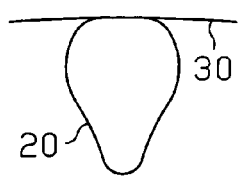
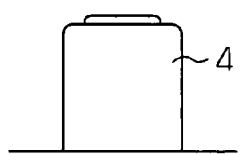
Fig.3(a-2)
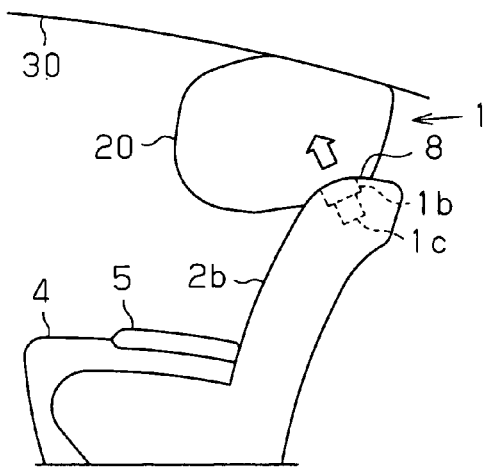
Fig.3(b-1)
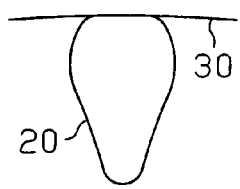
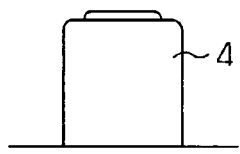
Fig.3(b-2)
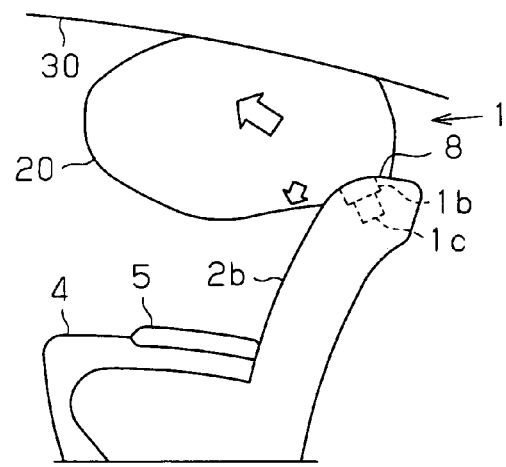
Fig.3(c-1)
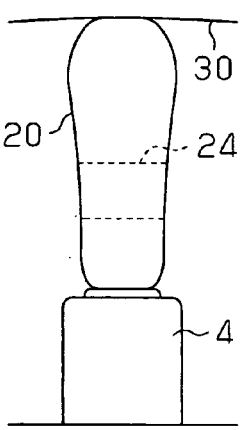
Fig.3(c-2)
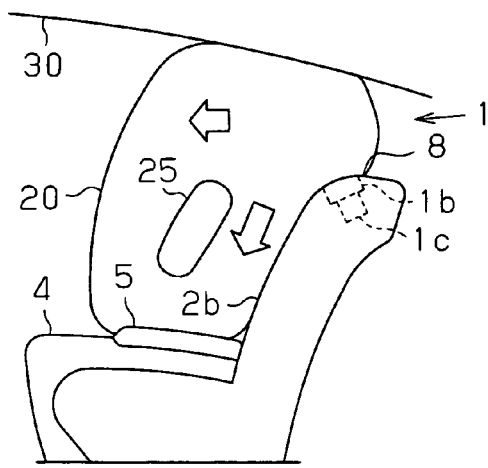

Fig.5(a-1)
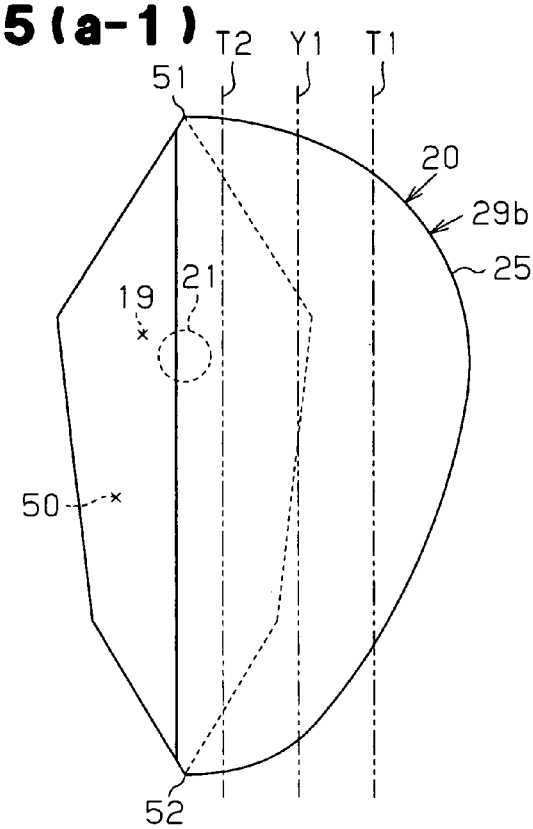
Fig.5(b-1)
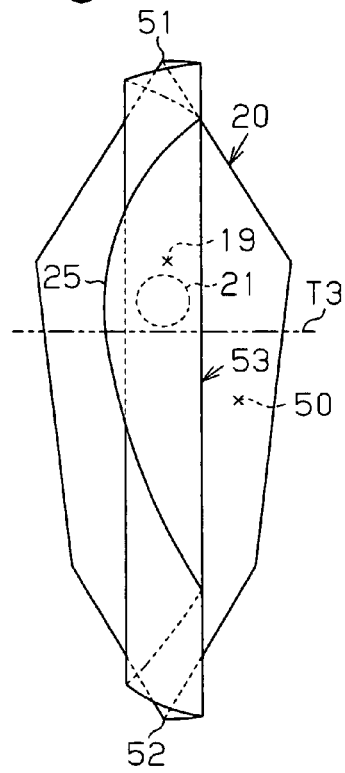
Fig.5(a-2)
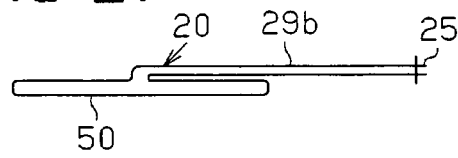
Fig.5(b-2)
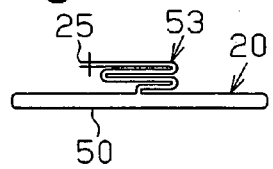
Fig.5(c-1)
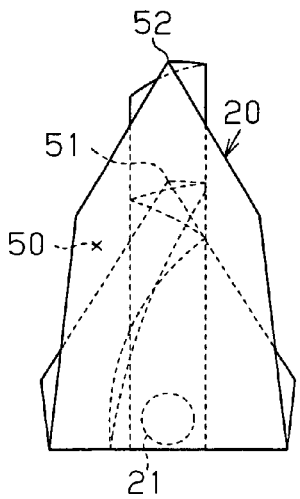
Fig.5(c-2)
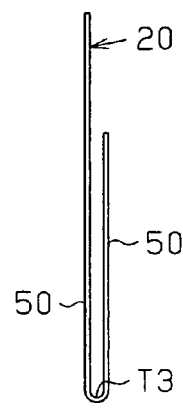
Fig.5(d)
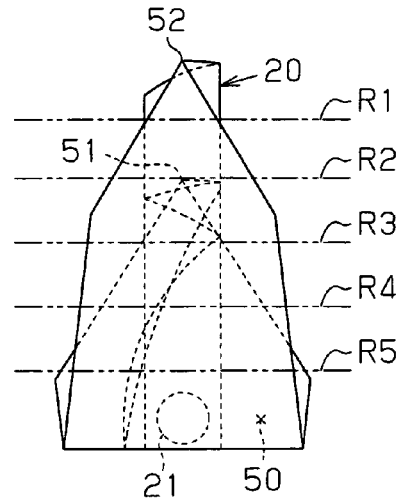

Fig.6(a-1)
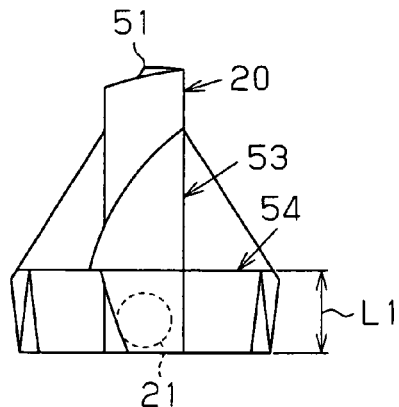
Fig.6(a-2)
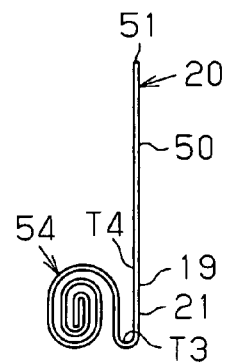
Fig.6(b-1)
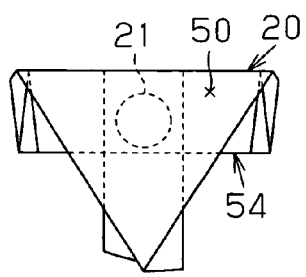
Fig.6(b-2)
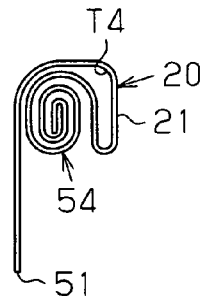
Fig.6(c-1)
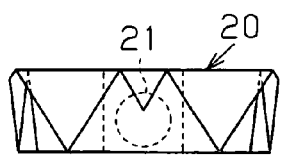
Fig.6(c-2)
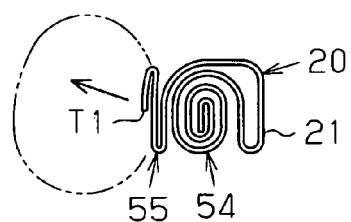
Fig.6(d)
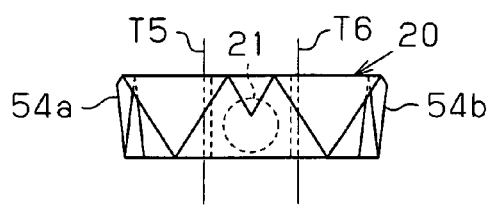
Fig.6(e)
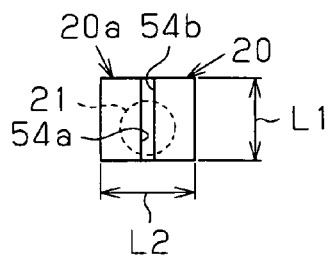

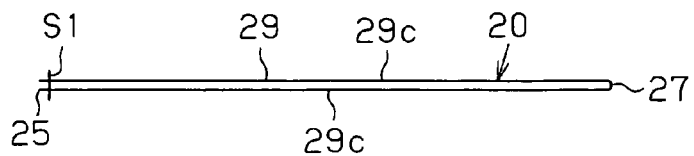
Fig.7(a)
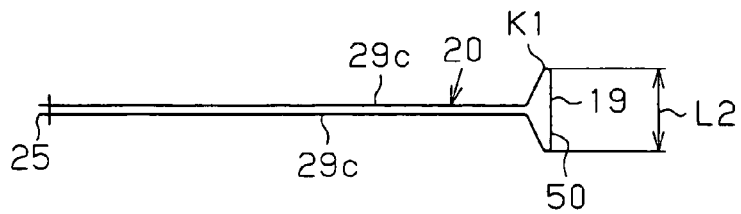
Fig.7(b)
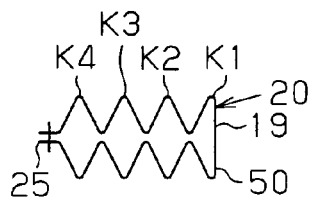
Fig.7(c)
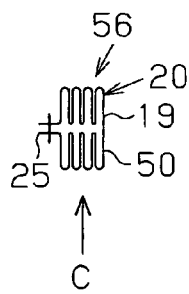
Fig.7(d)
Fig.7(e-1)    Fig.7(e-2)
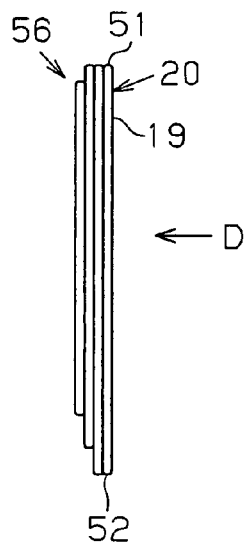
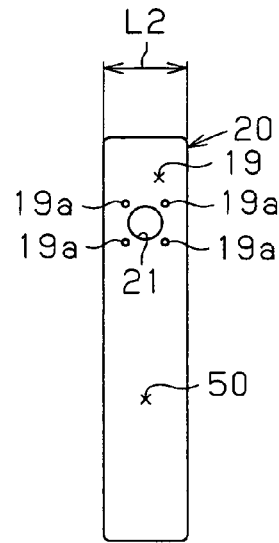

SIDE AIRBAG APPARATUS AND METHOD FOR FOLDING AIRBAG

BACKGROUND OF THE INVENTION

The present invention relates to a side airbag apparatus. More particularly, the present invention to a side airbag apparatus that, when a vehicle receives an impact due to a side collision, prevents an occupant seated on the far side of the impact from being moved toward the inside of the vehicle by the reaction of the impact, and to a method for folding an airbag.

Side airbag apparatuses for protecting an occupant in a side collision of vehicles are widely known. Side airbags include airbags for near side occupants that is inflated and deployed between an occupant and a vehicle structural member such as a door, and airbags for far side occupants. An airbag for near side occupants protects an occupant from a vehicle structural member that protrudes toward the vehicle inside due to the impact of a side collision. An airbag for far side occupants restricts the movement of an occupant toward the vehicle inside caused by the reaction of a side collision.

Japanese Laid-Open Patent Publication No. 2008-195355 discloses a method for folding an airbag, a method for storing an airbag, and an airbag apparatus. In the apparatus of the publication, two front seats spaced from each other in the lateral direction of the vehicle each have a vehicle body side airbag apparatus located on the near side of the seat back (the position closer to a side of the vehicle) and a seat side airbag apparatus on the far side of the seat back (the position further from the side of the vehicle). A part of the vehicle body side airbag is roll folded, and the remainder is folded toward the inflator by the accordion folding, the inward folding, or the combination of the two. The seat side airbag is folded toward the inflator by the accordion folding, the inward folding, or the combination of the two. When being inflated and deployed, the seat side airbag occupies the space between the seat backs. This prevents occupants or articles on the rear seats from moving forward and reduces the lateral movement of the occupants seated on the rear seats.

According to the airbags disclosed in the above publication, the seat side airbag apparatuses provided on the inner sides of the left and right seat backs prevent occupants on the rear seats from moving forward and reduces the inward movement of the occupants seated on the left and right front seats.

However, to protect occupants, the two seat side airbag apparatuses need to be simultaneously activated in a reliable manner. Such simultaneous activation is difficult. Further, since the airbag of each seat side airbag apparatus needs to be folded according to a prescribed folding pattern, the number of assembling processes is increased. This in turn increases the manufacturing costs.

The prescribed folding pattern of the airbags of the seat side airbag apparatuses is employed for allowing the airbags to be quickly deployed forward. However, the folding pattern prioritizes, for example, the protection of heads and therefore does not accelerate the upward deployment.

SUMMARY OF THE INVENTION

Accordingly, it is an objective of the present invention to provide a side airbag apparatus that is provided at one position in a top portion of a seat back and is capable of restricting the movement of an occupant toward the inside of the vehicle at a side collision by being inflated and deployed. Another objective is to provide a method for folding an airbag.

To achieve the foregoing objective and in accordance with one aspect of the present invention, a side airbag apparatus provided in the vicinity of a top of a seat back of a vehicle seat is provided. The apparatus includes an airbag, a storage portion storing the airbag, and an inflator located in the airbag. The airbag has an attachment portion attached to the inflator. The airbag is stored in the storage portion in such a manner that, when supplied with gas from the inflator, the airbag is inflated and deployed forward, upward, and downward from the storage portion. The airbag is stored in the storage portion after being folded in the procedure including: folding the flatly developed airbag by accordion folding along lines extending an up-down direction; folding a part below the attachment portion to form a roll folded portion; accordion folding a part above the attachment portion and overlapping the accordion folded part onto the front side of roll folded portion; and folding the airbag into a size storable in the storage portion.

In accordance with another aspect of the present invention, a method for folding an airbag used in a side airbag apparatus provided in the vicinity of a top of a seat back of a vehicle seat is provided. The side airbag apparatus includes a storage portion storing the airbag and an inflator located in the airbag. The airbag has an attachment portion attached to the inflator. The airbag is stored in the storage portion in such a manner that, when supplied with gas from the inflator, the airbag is inflated and deployed forward, upward, and downward from the storage portion. The method includes: folding the flatly developed airbag by accordion folding along lines extending an up-down direction; folding a part below the attachment portion to form a roll folded portion; accordion folding a part above the attachment portion and overlapping the accordion folded part onto the front side of roll folded portion; and folding the airbag into a size storable in the storage portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3($a$-1) to 3($c$-2) are diagrams showing an operation of the airbag apparatus, in which FIGS. 3($a$-1) to 3($c$-1) show the manner in which the airbag is inflated and deployed in the order, FIGS. 3($a$-1), 3($b$-1), and 3($c$-1) are front views of the airbag, and FIGS. 3($a$-2), 3($b$-2), and 3($c$-2) are side views showing the airbag;

FIGS. 5($a$-1) to 5($d$) are diagrams showing the first half of the folding procedure of the airbag, in which the airbag is folded in order;

FIGS. 6(*a-l*) to 6(*e*) are diagrams showing the second half of the folding procedure of the airbag, in which the airbag is folded in order; and FIGS. 7(*a*) to 7(*e*-2) are diagrams showing part of a folding procedure of an airbag according to a second embodiment of the present invention, in which the airbag is folded in order.

DETAILED DESCRIPTION OF THE PREFERRED EMBODIMENTS

First Embodiment

A side airbag apparatus 1 according to a first embodiment of the present invention will now be described with reference to FIGS. 1 to 6(*e*). In the present embodiment, the front-rear direction of the vehicle is defined as the front rear direction of the airbag, and the up-down direction of the vehicle is defined as the up-down direction of the airbag.

Figure 1:
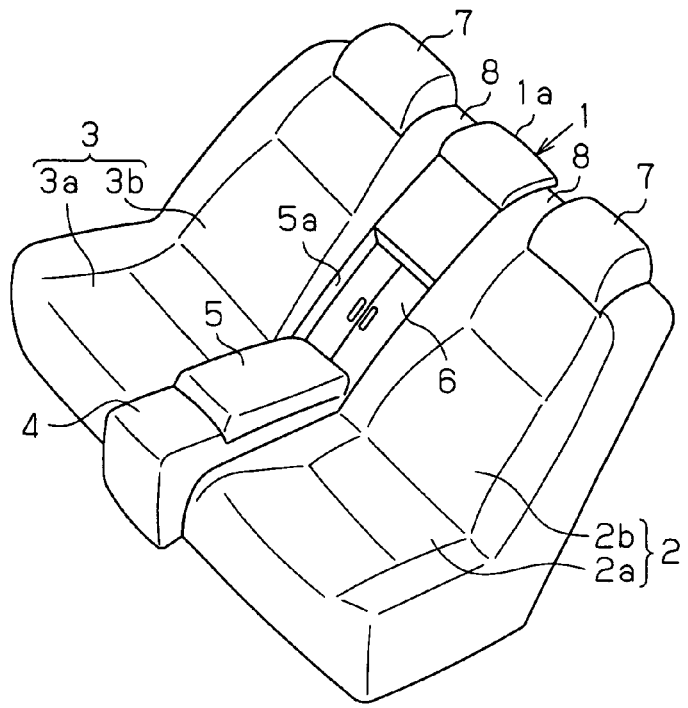
FIG. 1 is a perspective view schematically showing vehicle seats between which an airbag apparatus according to a first embodiment of the present invention is provided.

As shown in FIG. 1, the side airbag apparatus 1 of the present embodiment is located between tops 8 of seat backs 2*b*, 3*b* of rear seats 2, 3 arranged side by side. The side airbag apparatus 1 is located inside of an invisible airbag door 1*a*. The rear seats 2, 3 are formed by integrating seat cushions 2*a*, 3*a* and the seat backs 2*b*, 3*b*, respectively. A large sized center console 4 serving as a console member is located between the rear seats 2, 3. The seat cushions 2*a*, 3*a* refer to seating portion of the rear seats 2, 3 on which occupants are seated, and the seat backs 2*b*, 3*b* refer to the backrests of the rear seats 2, 3.

An armrest 5 is located on the center console 4. The armrest 5 is pivotable. When not in use, the armrest 5 is accommodated in a recess 5*a* between the seat backs 2*b*, 3*b* to form a part of the seat backs 2*b*, 3*b*. When the armrest 5 is in use as shown in FIG. 1, the door of a box such as a cold box 6 is exposed in the recess 5*a*. The height of left and right headrests 7 is adjustable as necessary. In FIG. 1, the headrests 7 are at the lowermost positions.

Figure 2:
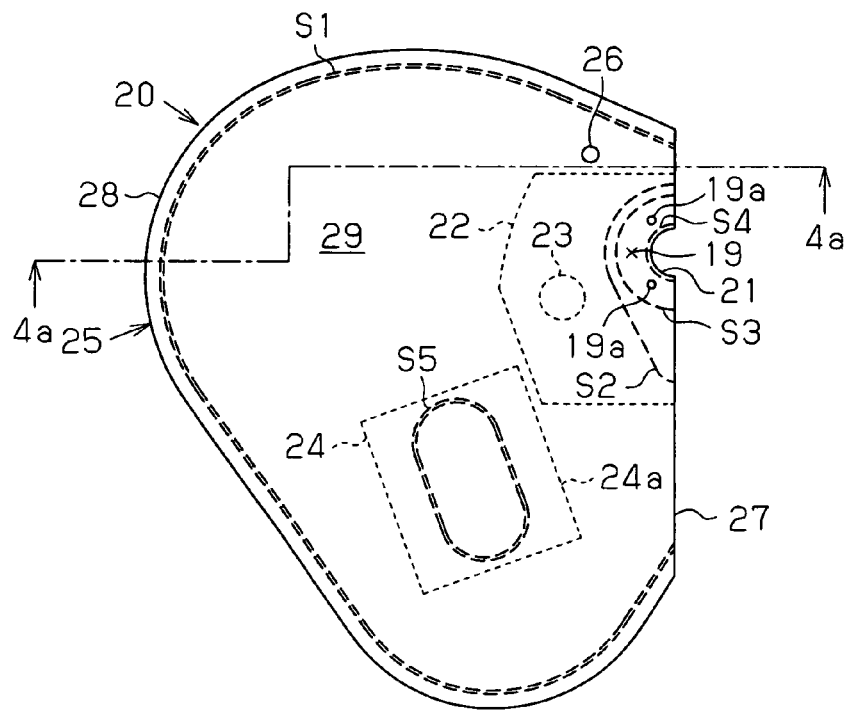
FIG. 2 is a plan view schematically showing an airbag apparatus according to the first embodiment of the present invention.
Figure 4A:
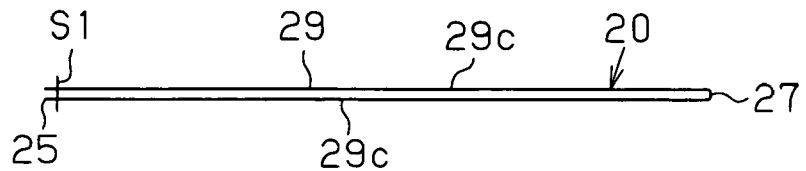
FIGS. 4($a$) to 4($c$) are cross-sectional views schematically showing steps for preparing folding of the airbag, in which FIG. 4($a$) is a cross-sectional view taken along line 4$a$-4$a$ of FIG. 2, FIG. 4($b$) shows a state where the airbag is folded to have a T-shape, and FIG. 4($c$) shows a state in which the front end of the airbag is arranged along a reference surface.
Figure 4B:
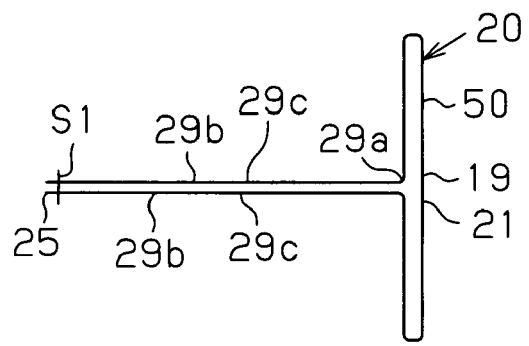

As shown in FIGS. 2 and 4(*a*), an airbag 20 is formed by folding in half a bilaterally symmetric fabric sheet 29 having two wings 29*c*. The airbag 20 has an inlet port 21 for supplying gas of an inflator 1*c* (shown in FIG. 3(*a*-2)) into the airbag 20. The airbag 20 is folded mountain-folded along lines extending upward and downward from the center of the inlet port 21. As a result, the wings 29*c* of the fabric sheet 29 are overlapped, and an outer periphery 28 of the overlapped fabric sheet 29 is sewn with double seam S1. The airbag 20 is formed into a bag shape by such sewing. The inflator 1*c* is fixed to the center console 4 between the seat backs 2*b*, 3*b*. Four attachment holes 19*a* provided about the inlet port 21 (only the front two of them are shown) receive fasteners such as screws for attaching the airbag 20 to the inflator 1*c*. The part about the inlet port 21 in which the attachment holes 19*a* are provided functions as an attachment portion 19 corresponding to the inflator 1*c*. The fabric sheet 29 is preferably formed of conventional synthetic resin fibers used as the material for airbag fabric, such as fibers of polyamide or polyester.

As shown in FIG. 2, a flow adjuster fabric sheet 22 is located in the airbag 20. The flow adjuster fabric sheet 22 has an inlet port (not shown) that is aligned with the inlet port 21 of the fabric sheet 29. The flow adjuster fabric sheet 22 is sewn to the fabric sheet 29 at seams S2, S3, and S4 with the inlet port 21 of the fabric sheet 29 and the flow adjuster fabric sheet 22 aligned with each other. When sewn, the flow adjuster fabric sheet 22 is tubular with upper and lower openings. The flow adjuster fabric sheet 22 has two outlet ports 23 (only one is shown) for supplying gas to a front end portion 25 in the airbag 20. In FIG. 2, the flow adjuster fabric sheet 22 is in a flatly developed state, so that the outlet port 23 faces sideways (on the surface of the sheet of the drawing). However, when gas is discharged from the inflator 1*c*, the flow adjuster fabric sheet 22 is inflated into a tubular shape, so that the outlet port 23 faces forward. The fabric sheet 29 also has a vent hole 26 for adjusting the gas pressure in the airbag 20.

Also, a tether 24 is provided in the airbag 20. The tether 24 is located in front of and below the flow adjuster fabric sheet 22. The tether 24 is formed by a tubular fabric body 24*a* having a peripheral wall at either end. The two peripheral walls of the tubular fabric body 24*a* are sewn to the wings 29*c* by oval double seams S5. Therefore, when the airbag 20 is inflated and deployed, parts of the airbag 20 to which the tether 24 is sewn each have the length of the tubular fabric body 24*a*, that is, a thickness equal to the measurement between the peripheral walls (the seams S5) of the tubular fabric body 24*a*.

The process in which the airbag 20 is inflated and deployed from a state in which it is folded and stored in a storage portion 1*b*, as discussed below, will be described with reference to FIGS. 3(*a*-1) to 3(*c*-2).

As shown in FIGS. 3(*a*-1) and 3(*a*-2), the airbag 20 stored in the storage portion 1*b* between the tops 8 of the seat backs 2*b*, 3*b* receives gas discharged by the inflator 1*c*. Accordingly, the airbag 20 breaks thin lines (not shown) of the airbag door 1*a* (FIG. 1), and inflated upward and forward. Then, the airbag 20 immediately contacts a ceiling 30. At this time, the airbag 20 is supported at two points, or a portion connected to the inflator 1*c* and a portion frictionally contacting the ceiling 30. Therefore, the airbag 20 is capable of reducing the movement of the head of an occupant, which is not restrained by a seat belt, when the occupant is moved toward the inside of the vehicle by the reaction of the impact of a side collision. Further, as shown in FIGS. 3(*b*-1) and 3(*b*-2), the forward inflation and deployment of the airbag 20 progresses.

Also, as shown in FIGS. 3(*c*-1) and 3(*c*-2), the downward inflation and deployment of the airbag 20 progresses. The gas pressure makes the airbag 20 tense in the up-down direction in the space between the ceiling 30 and the center console 4 with the armrest 5 in between. The natural length in the up-down direction of the airbag 20 when completely inflated and deployed is longer than the distance between the ceiling 30 and the center console 4. Since its inflation and deployment is limited in the space between the ceiling 30 and the center console 4, the airbag 20 generates tension in the up-down direction according to the extra length. Therefore, the airbag 20 is supported at three points, or the portion connected to the inflator 1*c*, the ceiling 30, and the center console 4. As a result, the airbag 20 is capable of receiving and protecting the upper body of the occupant, which is moved toward the inside of the vehicle by the reaction of a side impact.

Next, with reference to FIGS. 4(*a*) to 4(*c*) and FIGS. 6(*a*-1) to 6(*e*), the procedure for folding the airbag 20, which is inflated and deployed in the manner described in FIGS. 3(*a*-1) to 3(*c*-2), will be described. To facilitate understanding, unnecessary details are omitted from FIGS. 4(*a*) to 4(*c*) and FIGS. 6(*a*-1) to 6(*e*).

FIGS. 4(*a*) to 4(*c*) show a procedure of preparation for folding of the airbag 20. In the preparation, the airbag 20 is made flat as shown in FIG. 4(*a*), which is a cross-sectional view taken along 4*a*-4*a* of FIG. 2.

Then, as shown in FIG. 4(*b*), a mountain folded end 27 of the flat airbag 20 is collapsed to form a reference surface 50, which includes the inlet port 21 and the attachment portion 19. The reference surface 50 is formed by non-folded attachment portion 19. At this time, the airbag 20 is formed to have a T-shape as viewed from above so that the overlapped front and back remaining portions 29b of the fabric sheet 29 are perpendicular to the reference surface 50.

Figure 4C:
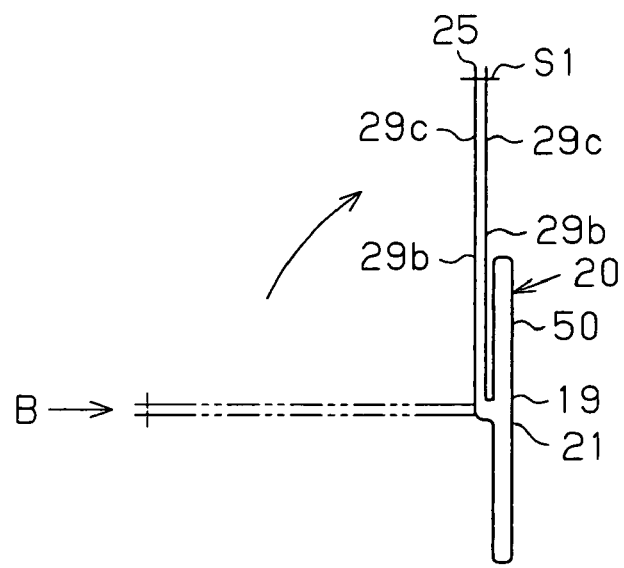

Then, as shown in FIG. 4(c), the remaining portion 29b is folded about an intersection 29a of the T. At this time, the remaining portions 29b and the reference surface 50 are arranged parallel with each other. In this manner, the preparation for the folding is completed.

FIG. 5(a-1) is a plan view showing the entire airbag 20 as viewed in the direction of arrow B in FIG. 4(c), or as viewed from above. The reference surface 50 is placed on a workbench (not shown), such that an upper end 51 and a lower end 52 of the reference surface 50 are arranged along the up-down direction. FIG. 5(a-2) is a side view of FIG. 5(a-1). As shown in FIG. 5(a-1), the remaining portions 29b are folded in an accordion manner in the order of a valley fold, a mountain fold, and a valley fold from the front end portion 25 along vertically extending valley fold line T1, mountain fold line Y1, and valley fold line T2. The airbag 20 in a folded state is shown in FIGS. 5(b-1) and 5(b-2). In this state, the remaining portions 29b are folded in an accordion fold to form an accordion folded portion 53. The accordion folding of the first embodiment refers to the case where the overlapped two remaining portions 29b are folded in the same directions at the fold lines. The accordion folding also includes a case where two remaining portions are folded in opposite directions at the fold lines (refer to FIGS. 7(c) and 7(d)). The second type of accordion folding will be discussed in the second embodiment.

Next, the airbag 20 is folded along a valley fold line T3 extending laterally in FIG. 5(b-1). That is, a part of the accordion folded portion 53 located below the attachment portion 19 and a part that forms the reference surface 50 are valley folded so that the lower end 52 of the accordion folded portion 53 is overlapped on the upper end 51. The airbag 20 in a folded state is shown in FIGS. 5(c-1) and 5(c-2).

Then, the airbag 20 is folded along roll fold lines R1 to R5 extending laterally in FIG. 5(d). That is, the valley folded part of the reference surface 50 and the accordion folded portion 53 are roll folded together from the lower end 52, in the order of the roll fold lines R1 to R5, so that the roll fold lines R1 to R5 are at corners of the roll. The roll folding forms the roll folded portion 54. The process of the roll folding is shown in FIGS. 6(a-1) and 6(a-2). A roll diameter L1 of the roll folded portion 54 is set to a height that allows the roll folded portion 54 to be stored in the storage portion 1b.

Further, as shown in FIGS. 6(b-1) and 6(b-2), a part of the accordion folded portion 53 including the upper end 51 (a part above the attachment portion 19) and a part of the reference surface 50 are valley folded along a valley fold line T4 extending laterally and overlapped on a part in front of the roll folded portion 54. Then, the valley folded portion is accordion folded, so as to form an accordion folded portion 55 shown in FIGS. 6(c-1) and 6(c-2). Accordingly, the folding with respect to the up-down direction is completed.

Lastly, a left end 54a and a right end 54b are valley folded along vertically extending valley fold lines T5, T6 shown in FIG. 6(d), respectively. A storable body 20a of the airbag 20 thus obtained is shown in FIG. 6(e). The roll diameter L1 and width L2 of the storable body 20a are set to be storable in the storage portion 1b.

The manner in which the airbag 20 is inflated, which results from the above described folding method, will be described. The inflation and deployment of the airbag 20 is executed generally in the reverse order of the folding. However, due to the characteristics of the folding according to the present embodiment, the order of the deployment is not exactly in the reverse order of the order of the folding, as described below.

First, the inflation and deployment of the airbag 20 is started when the left end 54a and the right end 54b are opened leftward and rightward by supplying gas to the storable body 20a shown in FIG. 6(e) from the inflator 1c through the inlet port 21.

Next, the accordion folded portion 55 of the airbag 20 shown in FIGS. 6(c-1) and 6(c-2) is unfolded. The airbag 20 then proceeds diagonally upward along an arrow shown in FIGS. 6(c-2), and to an initial inflation and deployment state shown by alternate long and two short dashes line in FIG. 6(c-2) and in FIGS. 3(a-1) and 3(a-2). That is, immediately after the airbag 20 is inflated and comes out from the storage portion 1b to the passenger compartment, by receiving gas from the inflator 1c, the accordion folded portion 55 is unfolded. Further, a part of the accordion folded portion 53 including the upper end 51 (the part above the attachment portion 19), so that the airbag 20 is quickly inflated upward and forward. Thus, even when the head of the occupant, which is not restrained by the seat belt) starts moving toward the vehicle inside at the initial stage of the side collision, the movement of the head is limited by the airbag 20 in the initial stage of the deployment.

Further, the gas pressure unfolds the roll folded portion 54, which has been rolled inward toward the reference surface 50 having the inlet port 21 and the attachment portion 19. Then, as shown in FIGS. 6(b-1), 6(b-2), 6(c-1), and 6(c-2), the airbag 20 is inflated and deployed downward. The deployment of the roll folded portion 54 lags behind the deployment of the accordion folded portion. Further, the roll folded portion 54 further lags behind since it has been rolled inward. At this time, due to the portion that has been valley folded along the valley fold line T3 to form the roll folded portion 54, the part of the accordion folded portion 53 including the lower end 52 (the part below the attachment portion 19) is inflated and deployed after the roll folded portion 54 is unfolded. Further, a front end portion including the lower end 52 (the front end portion located below the attachment portion 19) is deployed lastly because the tether 24 causes the gas to detour. In this manner, the deployment of the portion including the lower end 52 (the part below the attachment portion 19) is delayed. In other words, during the delay of the inflation and deployment of the part including the lower end 52 (the part below the attachment portion 19), the gas supplied by the inflator 1c is efficiently used for the further upward and forward inflation and deployment of the airbag 20.

Accordingly, the side airbag apparatus 1 according to the above embodiment has the following advantages.

(1) Between the ceiling 30 of the passenger compartment and the center console 4 provided between the seat cushions 2a, 3a, the airbag 20 receives the pressure of the inflation gas supplied by the inflator 1c. The airbag 20 is then supported by its own tension in the up-down direction. Therefore, the airbag 20 is supported at three points, or the portion connected to the inflator 1c, the ceiling 30, and the center console 4. Accordingly, it is possible to prevent the occupant from being moved toward the inside of the vehicle by the reaction and impact of a side collision.

(2) The airbag 20, which projects from the storage portion 1b, is first inflated and deployed upward and forward. In the course of the inflation and deployment, the airbag 20 is inflated and deployed downward. The airbag 20 is folded in such a manner that it is inflated and deployed in the above described manner. When receiving the reaction of the impact of a side collision, the occupant can hardly resist the moving force toward the inside of the vehicle applied to the upper body, particularly, to the head, although the lumbar region is restrained by the seat belt. However, the airbag 20 in the initial stage of inflation and deployment blocks the movement of the head of the occupant and thus limits the head movement. Then, the airbag 20 continues to be inflated and deployed so as to be supported by its own tension between the ceiling 30 and the center console 4. Since this limits the movement of the upper body of the occupant toward the vehicle inside, the occupant located on the far side of the side collision is effectively protected from the impact of the side collision.

(3) The airbag 20 is folded in the following manner. After, the flatly developed airbag 20 is formed to have a T-shaped cross section, the remaining portions 29b is accordion folded to form the accordion folded portion 53. A part of the accordion folded portion 53 including the lower end 52 (the part below the attachment portion 19) and a part of the reference surface 50 are roll folded to form the roll folded portion 54. Further, the remaining part of the accordion folded portion 53 including the upper end 51 (the part above the attachment portion 19) and a part of the reference surface 50 are accordion folded to form the accordion folded portion 55. Then, the left end 54a and the right end 54b of the airbag 20, the folding of which has been completed with respect to the up-down direction, are valley folded, so that the storable body 20a having a size storable in the storage portion 1b is formed. Thus, the airbag 20 is inflated and deployed in the reverse direction of the order of folding. However, the deployment of the roll folded portion 54 is delayed. That is, the inflation and deployment of the airbag 20 projecting from the storage portion 1b starts at a part of the accordion folded portion 53 including the upper end 51 (the part above the attachment portion 19), and the inflation and deployment that unfolds the roll folded portion 54 is started during the inflation and deployment of the part including the upper end 51. Thus, at a position that corresponds to the height of the head of the occupant, the inflation and deployment of the airbag 20 is performed in an initial stage of the inflation. This reliably limits the movement of the occupant's head toward the vehicle inside, thereby protecting the occupant's head.

(4) The rolling of the roll folded portion 54 is directed inward in relation to a surface along the attachment portion 19 of the airbag 20. Thus, when the roll folded portion 54 is unfolded by the gas pressure, the roll folded portion 54 is deployed downward, which is a direction different from that in the initial stage of the deployment of the airbag 20, unlike the case where the roll folded portion 54 is rolled outward. Therefore, in relation to the parts that are inflated and deployed upward and forward, the deployment of the part that is inflated and deployed downward is delayed. Thus, the gas of the inflator 1c is efficiently supplied to the upward and forward inflation and deployment of the airbag 20.

(5) The side airbag apparatus 1 accommodating the airbag 20 is provided between the tops 8 of the left and right seat backs 2b, 3b of the rear seat 2, 3. Therefore, when inflated and deployed, the airbag 20 is supported by its own tension in the up-down direction at three points, or the large sized center console 4 located between the seat cushions 2a, 3a, the ceiling 30, and the part connected to the inflator 1c. Thus, the side airbag 1 is provided that reliably limits the movement of the occupant toward the vehicle inside.

Second Embodiment

A side airbag apparatus 1 according to a second embodiment of the present invention will now be described with reference to FIGS. 7(a) to 7(e-2). In the second embodiment, the differences from the folding method of the airbag 20 according to the first embodiment will mainly be discussed, and descriptions of like or the same components will be omitted. That is, the second embodiment is different from the first embodiment in that when the flat fabric sheet 29 of the airbag 20 is folded, the fabric sheet 29 is accordion folded in a manner different from that of the first embodiment. In the first embodiment, the overlapped two remaining portions 29b are folded in the same directions at the fold lines, while in the second embodiment, the overlapped two wings 29c are folded in opposite directions at the fold lines. The accordion folding in the second embodiment is defined as "cactus folding."

A flat airbag 20 is shown in FIG. 7(a), which is a cross-sectional view taken along line 4a-4a of FIG. 2. In the vicinity of the mountain folded end 27, a first cactus folded portion K1 is formed by cactus folding (inward folding) as shown in FIG. 7(b), and a reference surface 50 containing the inlet port 21 and the attachment portion 19 is formed. The reference surface 50 is formed to have a width L2 required for storing the storage portion 1b or a width wider than the width L2. The following discusses the case where the width of the reference surface 50 is set to be the width L2.

Next, as shown in FIG. 7(c), the wings 29c of the fabric sheet 29 are sequentially cactus folded from the reference surface 50 in the order of second to fourth cactus folded portions K2 to K4. Then, as shown in FIG. 7(d), a cactus folded portion 56 is formed in the entire airbag 20. At this time, the elongated cactus folded portion 56 is formed in the airbag 20 as shown in FIG. 7(e-1), which is a view from the direction of arrow C in FIG. 7(d), and in FIG. 7(e-2), which is a view from the direction of arrow D in FIG. 7(e-1).

The process of this folding, which is performed in accordance with the second embodiment, will hereafter be briefly explained with reference to FIGS. 5(a-1) to 5(d), and FIGS. 6(a-1) to 6(e).

As shown in FIG. 5(c-2), a part of the fabric sheet 29 that forms the cactus folded portion 56 below the attachment portion 19 is folded along the valley fold line T3, so that the lower end 52 of the cactus folded portion 56 is overlapped onto the upper end 51. As shown in FIG. 6(a-2), a part including the lower end 52 (a part below the attachment portion 19) is roll folded to form a roll folded portion 54. As shown in FIG. 6(b-2), a part including the upper end 51 (a part above the attachment portion 19) is valley folded along the valley fold line T4 and overlapped onto the roll folded portion 54. As shown in FIG. 6(c-2), the extruded part including the upper end 51 shown in FIG. 6(b-2) is accordion folded to form an accordion folded portion 55. Accordingly, the folding is completed, so that the airbag 20 has a size that is storable in the storage portion 1b as shown in FIG. 6(e).

In the above process, the width of the reference surface 50 is set to the width L2 storable in the storage portion 1b. Instead, when the width of the reference surface 50 is set wider than the width L2, the left end 54a and the right end 54b are both valley folded inward as shown in FIG. 6(d), so that the airbag 20 having a shape shown in FIG. 6(e) is obtained. In this case, the dimensional control at the cactus folding is easier than the case where the width of the reference surface 50 is set to be less than or equal to the width L2 from the beginning.

(6) In the second embodiment, the reference surface 50 including the inlet port 21 and the attachment portion 19 is formed at the mountain folded end 27 of the flatly developed airbag 20. Thereafter, the wings 29c of the fabric sheet 29 are cactus folded. Thus, the cactus folded portion 56 can be quickly inflated and deployed in a direction opposite to the direction of the cactus folding. Therefore, it is possible to provide a side airbag that prevents an occupant located on the far side of a side collision from moving toward the vehicle inside, thereby protecting the occupant.

(Modifications)

It should be noted that the embodiments shown above may be modified as follows.

In the illustrated embodiments, the rolling of the roll folded portion 54 is directed inward in relation to a surface along the attachment portion 19 of the airbag 20. However, the rolling may be directed outward. Even if the roll folded portion 54 is rolled outward, the inflation and deployment of the roll folded portion 54 is delayed relative to the accordion folded portion 53 or the cactus folded portion 56 because the airbag 20 is valley folded at the valley fold line T3.

In the illustrated embodiments, the side airbag apparatus 1 is located at the center, or between the tops 8 of the left and right seat backs 2b, 3b of the rear seats 2, 3. However, the side airbag apparatus 1 may be located between the tops of the seat backs of the front seats.

In the second embodiment, the reference surface 50 including the inlet port 21 and the attachment portion 19 at the mountain folded end 27 of the flatly developed airbag 20. Thereafter, the wings 29c of the fabric sheet 29 are sequentially cactus folded from the reference surface 50. Instead, the wings 29c of the fabric sheet 29 may be sequentially cactus folded from the front end portion 25 after the reference surface 50 is formed.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus provided in the vicinity of a top of a seat back of a vehicle seat, comprising:
    an airbag;
    a storage portion storing the airbag; and
    an inflator located in the airbag,
    wherein the airbag has an attachment portion attached to the inflator,
    wherein the airbag is stored in the storage portion in such a manner that, when supplied with gas from the inflator, the airbag is inflated and deployed forward, upward, and downward from the storage portion,
    wherein the airbag is stored in the storage portion after being folded in the procedure including:
    folding the flatly developed airbag by accordion folding along lines extending an up-down direction;
    folding a part below the attachment portion to form a roll folded portion;
    accordion folding a part above the attachment portion and overlapping the accordion folded part onto the front side of roll folded portion; and
    folding the airbag into a size storable in the storage portion.

2. The side airbag apparatus according to claim 1, wherein the seat is one of two seats arranged side by side, and the vehicle has a ceiling and a console member located between the seats, and wherein, when inflated and deployed, the airbag is made tense in the up-down direction in the space between the ceiling and the console member and its inflation and deployment is stopped in this state.

3. The side airbag apparatus according to claim 1, wherein the roll folded portion is rolled inward in relation to a surface along the attachment portion.

4. The side airbag apparatus according to claim 1, wherein the seat is one of two rear seats arranged side by side, and the storage portion is located between the tops of the seat backs of the rear seats.

5. The side airbag apparatus according to claim 1, wherein, when the airbag is inflated and deployed, a part of the airbag below the attachment portion is inflated and deployed downward after a part of the airbag above the attachment portion is inflated and deployed upward and forward.

6. The side airbag apparatus according to claim 1, wherein the accordion folding is performed by folding overlapped two parts of the airbag in same directions at fold lines.

7. The side airbag apparatus according to claim 1, wherein the accordion folding is performed by folding overlapped two parts of the airbag in opposite directions at fold lines.

8. A method for folding an airbag used in a side airbag apparatus provided in the vicinity of a top of a seat back of a vehicle seat,
    the side airbag apparatus including:
    a storage portion storing the airbag; and
    an inflator located in the airbag,
    wherein the airbag has an attachment portion attached to the inflator,
    wherein the airbag is stored in the storage portion in such a manner that, when supplied with gas from the inflator, the airbag is inflated and deployed forward, upward, and downward from the storage portion,
    the method comprising:
    folding the flatly developed airbag by accordion folding along lines extending an up-down direction;
    folding a part below the attachment portion to form a roll folded portion;
    accordion folding a part above the attachment portion and overlapping the accordion folded part onto the front side of roll folded portion; and
    folding the airbag into a size storable in the storage portion.

* * * * *